COMBINATION RECORD AND ERASE HEAD HAVING A MAGNETIC HOUSING

Filed March 4, 1963

INVENTORS
CHARLES F. MURPHY
LEO W. PAGE
BY Price & Heneveld
ATTORNEYS

United States Patent Office 3,311,710
Patented Mar. 28, 1967

3,311,710
COMBINATION RECORD AND ERASE HEAD HAVING A MAGNETIC HOUSING

Charles F. Murphy, Vermontville, and Leo W. Page, Potterville, Mich., assignors to Michigan Magnetics, Inc., Vermontville, Mich., a corporation of Michigan Filed Mar. 4, 1963, Ser. No. 262,525
8 Claims. (Cl. 179—100.2)

This invention concerns magnetic tape recorder heads, and more particularly a combination erase and record head and a method of making the same.

With the increasing miniaturization of electronic equipment and the intense competition in the tape recorder field, manufacturers of tape recorder heads have been increasingly confronted with the task of making tape recorder heads smaller, less costly, and more accurately aligned. The present invention is concerned with a simple and effective method of accomplishing this end by consolidating the normally separate erase and record heads into a single unit and utilizing the common housing as part of the magnetic circuit for the erase head.

Since presently erase and record heads are made separately and then connected or mounted together for use in combination, a problem has been created of how to economically mount these heads together in concise alignment. The present invention not only solves this problem by mounting the two heads in a common housing, but at the same time does so by a method of manufacture which is considerably less expensive than is presently practiced and which assures concise alignment.

It is therefore the object of this invention to provide a single head unit containing both an erase gap and a record gap.

It is a further object of the invention to provide a head unit for tape recorders in which the housing or shield is itself a part of the magnetic circuit of the erase coil.

It is still another object of this invention to provide a device of the type described in which the record circuit is not affected by the erasing flux flowing in its housing.

Another object is to provide a method of manufacturing the novel combination of erase and record head.

These and other objects of the invention will become apparent from a consideration of the following specification, taken in connection with the accompanying drawings in which.

Figure 1:
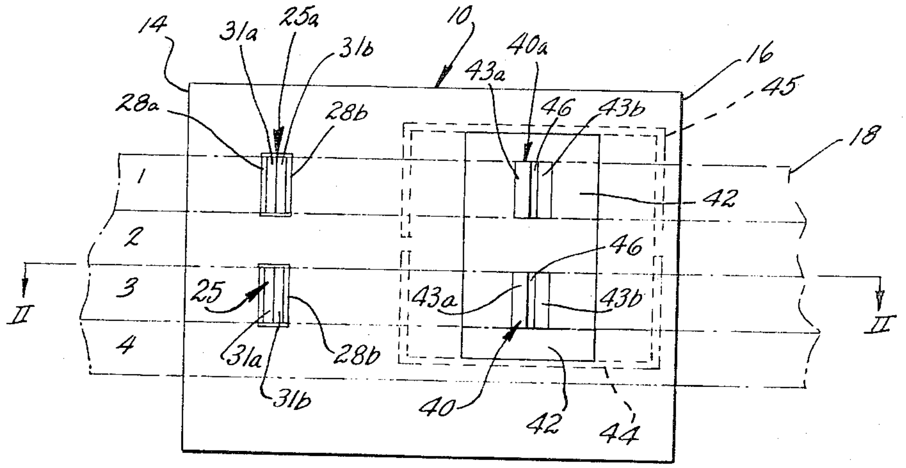
FIG. 1 is a top plan of the combination head of this invention.

Basically, the device of this invention consists of a single magnetically permeable housing which has both an erase circuit and a record circuit mounted therein. (The word "circuit" as used in this application should be understood to refer to a magnetic circuit as opposed to an electrical circuit.) The record circuit is completely self-contained and is magnetically insulated from the housing. The erase circuit, on the other hand, includes part of the housing and thus creates a magnetic flux in the housing itself. This arrangement not only greatly simplifies the erase circuit construction, but also permits the grinding, polishing, and finishing of the tape-engaging surface of the combination head in a single operation. Furthermore, the fact that both circuits are enclosed in the same housing provides for automatic alignment of the erase gap with the record gap and makes impossible any alteration of this alignment by external factors following the mounting of the head in a tape recorder.

The method of this invention comprises the steps of providing a common housing with at least two aligned openings on the tape-receiving face and mounting the erase head and the record head in these openings in such a fashion that the cores protrude therefrom; and thereafter simultaneously grinding the protruding cores down to the said face in one simple operation. This provides for lower manufacturing costs and assurance of alignment in all dimensions.

Referring now to the drawings, reference numeral 10 designates a housing of low reluctance material and having a tape-engaging top or face 12 and at least two sides 14, 16. A magnetic tape 18 (shown in phantom) having four tracks 1, 2, 3 and 4 is drawn over the tape-engaging face 12 from left to right in FIG. 1 when the apparatus is in use. In the position shown, signals would be recorded on tracks 1 and 3 as it is being drawn over the face 12. When the tape is turned over, signals are recorded on tracks 2 and 4.

Mounted in the single housing 10 are the record heads 40 and 40*a* and erase heads 25 and 25*a* protruding through the openings 11. The erase heads 25 and 25*a* each comprise the core 26, coil 24 mounted about the core and a terminal 27 electrically connected to the coil 24 by the leads 29 as shown.

The core 26 is a sheet of low reluctance material such as steel folded upon itself to form the base 30 and the forward end 31. Base 30 and end 31 are offset from each other by the intermediate portions 32*a* and 32*b*. The two sheet portions 30*a* and 30*b* of base 30 are compressed together and preferably welded to each other and the side 14 forming in effect a continuous solid piece of wall of low reluctance material. The two intermediate sheet portions 32*a* and 32*b* are preferably spaced as shown providing two separate paths for the magnetic current. The two end sheet portions 31*a* and 31*b* of the forward end 31 are located adjacent each other but by virtue of skin effect also provide two separate paths for the magnetic current. These two end sheet portions extend through an opening in the top or face 12 of the housing 10 and terminate flush with the face 12. The leading and trailing edges are separated from the housing by thin copper shims which provide two gaps 28*a* and 28*b* for the two magnetic circuits formed by each erase head. The entire erase head components are rigidly held in housing 10 by any suitable means such as a potted resin. With this construction the magnetic flux or current induced in core 26 by the erase coil 24 flows through separate paths in each of the end portions 31*a* and 31*b*, across the gaps 28*a* and 28*b*, through the housing, base 30, intermediate portions 32*a* and 32*b* and back to end portions 31*a* and 31*b*, respectively.

The record heads 40 and 40*a* are each constructed of two substantially U-shaped magnet cores or core pieces 36*a* and 36*b* mated together in such a fashion that their inner arms 37*a* and 37*b* engage each other and the outer arms 38*a* and 38*b* nearly engage each other being separated only by a thin sheet or foil of non-magnetic material to form a magnetic gap 46. The magnetic signal formed in this gap coacts with the recording tape 18 as it is drawn across the face 12.

Located on the bridge formed by the inner arms 37*a* and 37*b* is the record coil 34 which is connected to the terminals 39 and 39*a*.

The two record heads 40 and 40*a* are enclosed in a zinc die cast housing or encasement 42 about which is mounted the stray current shields 44 and 45 (FIGS. 2 and 3) the purpose of which will be later explained.

Figure 2:
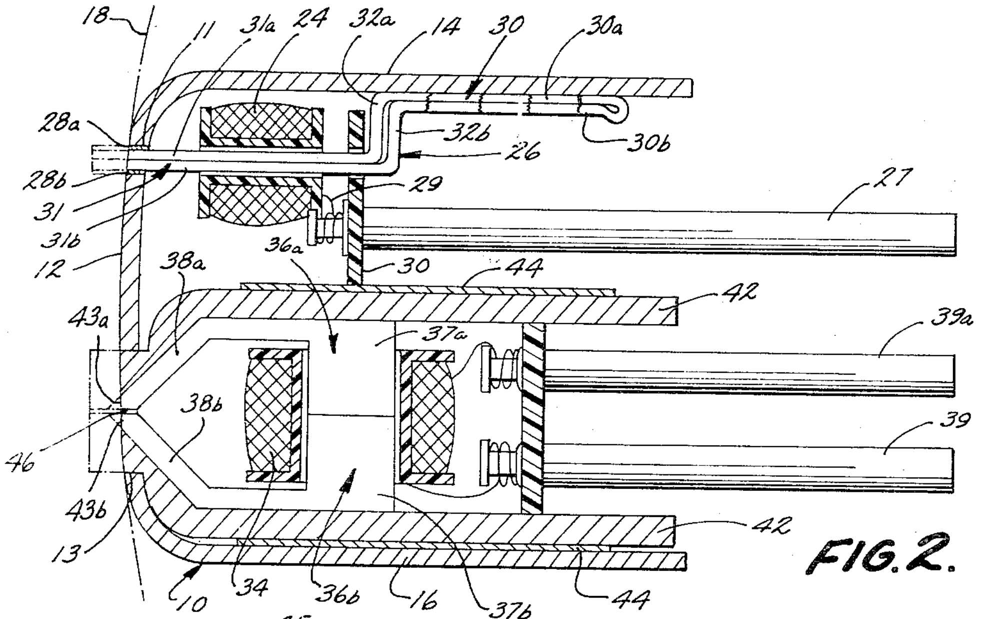
FIG. 2 is an elevational sectional view of the combination head taken along plane II—II of FIG. 1.
Figure 3:
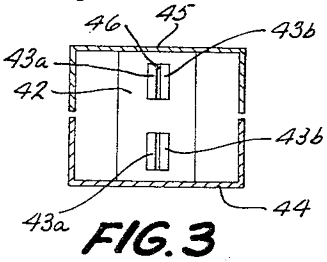
FIG. 3 is a top view of the record heads assembly removed from the housing and illustrating the position of the stray current shields.

As shown by FIG. 2 the top end of the entire encased assembly projects through the opening 13 in the top face 12 of housing 10. The entire recording head assembly including encasement 42 and exposed tips 43*a* and 43*b* of the outer core arms 38a and 38b, respectively, are ground flush with the face 12 of housing 10 to provide the exposed core and gap configuration as shown by FIG. 1.

METHOD OF MANUFACTURE

An important advantage of this invention is the low cost of manufacture and the accurate alignment of the erase and record heads in all dimensions which is made possible by the novel construction and method of manufacturing the same.

The method of manufacture comprises first forming or providing the housing 10 and the forming the openings 11 and 13 in the face thereof in any well-known manner. It is essential that the relative position or alignment of these openings is accurate because they establish the position of the heads.

The next step is to mount the cores 26 and coils 24 in the housing. This is accomplished by welding the cores 26 to the side 14 of the housing with the coils 24 mounted thereabout. The exact manner of supporting coils 24 on the base 30 is not important and can be accomplished in any way within the purview of one skilled in the art. The important aspect is mounting the cores 26 with the forward end 31 extending and protruding entirely through the openings 11 beyond the surface of face 12 as shown in phantom in FIG. 2.

The next step would be to form the record head assembly as a separate unit. This is accomplished by arranging the core pieces 36a and 36b, coils 34, and terminals 39 and 39a in the positions shown and encasing them in the zinc die cast housing or encasement. As shown in phantom by FIG. 2, this entire assembly is then positioned in the housing 10 with its forward or top end extending and protruding entirely through opening 13. The record and erase assemblies are firmly mounted in the housing 10 by a hardened plastic (not shown).

After the entire assembly of the erase heads and record heads are completed with the top or forward ends thereof protruding through their respective openings 11 and 13 beyond the surface of the face 12, these ends are then ground down to be flush with the surface of face 12 which essentially completes the manufacturing process.

OPERATION

The operation of this combined erase and record head should be evident from the above description. When mounted in a recorder the head is arranged so that the tape 18 is drawn across the top face 12 from left to right in FIG. 1. The tape thus first passes over the erase heads causing the magnetic flux to flow through the gaps 28a and 28b and the tape which erases any signal impressed on the tape. Thereafter, any magnetic signals produced by record coil 34 across the gaps 46 are impressed on the tape and later are reproduced by another similar record head in a well-known manner.

An important aspect of this invention is the provision for the record and erase head to be located in a common housing without one head interfering with the operation of the other. This is accomplished by providing a housing with two aligned openings in which the respective heads are located and encasing the record heads in a zinc die cast housing or encasement as above described so that it is completely insulated from the erase head. Thus, the erase heads are effectively shielded against magnetic flux flowing through the housing 10 which purposely is made a part of the magnetic circuit of the erase head.

Under the right conditions, sometimes, when only one of the record heads is recording, the radiation from the recording coil creates stray currents which in turn create lines of flux between the two recording heads setting up a signal on the other non-recording head. This is particularly possible when the heads are located a short distance from the trailng edge of the housing because the stray currents do not have sufficient distance to dissipate. To avoid this possibility, we provide the shields 44 and 45 on the record head housing or encasement 42. These shields in effect provide a split shield about the housing which picks up any stray magnetic currents radiating from the coils. This split shield, by virtue of the split, stops and prevents the continuous flow of magnetic flux about both coils and thus prevents the setting up of a signal normally caused by such continuous flow.

Still another important aspect of this invention is the construction and operation of the erase head. As previously stated, two erase gaps are provided by the construction, this being made possible by creating two paths. One path is the base 30, intermediate portion 32a, end portion 31a, gap 28a and housing 10. The other path is base 30, intermediate portion 32b, end portion 31b, gap 28b, and housing 10. Magnetic flux flows through each of these paths in substantially equal intensity due to the low reluctance or high magnetic permeability of housing 10.

It will be seen that the present invention provides a compact, inexpensive, yet efficient and perfectly aligned combination erase and record head which actually uses its housing as part of the magnetic flux path to reduce costs, facilitate manufacture, and produce a superior head. Obviously, the teachings of the invention can be carried out in many different ways, of which the embodiment illustrated and described herein is merely illustrative. Consequently, we do not desire to be limited by the embodiment shown, but only by the scope of the following claims.

We claim:

1. A combination head for tape recorders, comprising: a housing of magnetically permeable material having a tape-engaging face; erasing head means in said housing forming a magnetic circuit with a portion of said housing; said erasing head means including core means protruding through said tape-engaging face and forming an erasing gap means between said core means and said housing at said tape-engaging face; recording head means in said housing including a magnetic circuit having core pieces protruding through said tape-engaging face and forming a recording gap between the core pieces; said erasing gaps and recording gaps being aligned, and means for magnetically insulating said recording head means from said housing and erasing head means.

2. A combination head for tape recorders, comprising: a housing of magnetically permeable material having a tape-engaging face and sides; an erase coil mounted in said housing; an elongated erase core extending through said erase coil, said core being affixed at one of its ends to one of said sides in gapless magnetic contact therewith, and the other end of said core being offset from said one end and protruding through said tape-engaging face and being separated therefrom by a thin layer of nonmagnetizable material to form an erase gap; a record coil mounted in said housing with a magnetic circuit means associated therewith, said record coil and magnetic circuit being encased in a magnetically insulated encasement thereby being magnetically insulated from said housing and from said erase coil; said magnetic circuit means having an exposed portion protruding through said tape-engaging face and providing a record gap thereat aligned with the erase gap formed by said erase core.

3. A combination head for tape recorders, comprising: a housing of magnetically permeable material having a tape-engaging face and sides extending downwardly therefrom, said tape-engaging face having at least two openings aligned with each other in the direction in which a tape is to be drawn over said face; erasing head means in said housing forming a magnetic circuit with a portion of said housing; said erasing head means including a coil and core means protruding through one of said openings in said tape-engaging face in a manner such as to form an erasing gap means between said core means and said housing at said tape-engaging face; recording head means in said housing including a coil and a magnetic circuit having core pieces protruding through the other of said openings in said tape-engaging face and forming a recording gap between the core pieces; and means for magnetically insulating said recording head means from said housing and erasing head means.

4. A combination head for tape recorders, comprising: a housing of magnetically permeable material having a tape-engaging face and sides extending downwardly therefrom, said tape-engaging face having at least two openings aligned with each other in the direction in which a tape is to be drawn over said face; erasing head means in said housing including a coil mounted about a relatively flat core secured at one end to one of said sides and having its other end offset from said one end and extending through one of said openings with a gap therebetween at said tape-engaging face whereby said core forms a magnetic circuit with a portion of said housing; recording head means in said housing including a coil and a magnetic circuit having core pieces protruding through the other of said openings in said tape-engaging face and forming a recording gap between the core pieces; and means for magnetically insulating said recording head means from said housing and erasing head means.

5. A combination head for tape recorders, comprising: a housing of magnetically permeable material having a tape-engaging face and sides extending downwardly therefrom, said tape-engaging face having at least two openings aligned with each other in the direction in which a tape is to be drawn over said face; erasing head means in said housing forming a magnetic circuit with a portion of said housing; said erasing head means including a coil and core means protruding through one of said openings in said tape-engaging face in a manner such as to form an erasing gap means between said core means and said housing at said tape-engaging face; recording head means in said housing including a coil and a magnetic circuit having core pieces protruding and exposed through the other of said openings in said tape-engaging face and forming a recording gap between the core pieces; said recording head means, except for the exposed portions of said core, being encased in a magnetically insulated materilal for magnetically insulating said recording head means from said housing and erasing head means.

6. A combination head for tape recorders, comprising: a housing of magnetically permeable material having a tape-engaging face and sides extending downwardly therefrom, said tape-engaging face having at least two openings aligned with each other in the direction in which a tape is to be drawn over said face; erasing head means in said housing including a coil mounted about a relatively flat core secured at one end to one of said sides and having its other end offset from said one end and extending through one of said openings with a gap therebetween at said tape-engaging face whereby said core forms a magnetic circuit with a portion of said housing; recording head means in said housing including a coil and a magnetic circuit having core pieces protruding and exposed through the other of said openings in said tape-engaging face and forming a recording gap between the core pieces; said recording head means, except for the exposed portions of said core, being encased in a magnetically insulated material for magnetically insulating said recording head means from said housing and erasing head means.

7. A combination head for tape recorders, comprising: a housing of magnetically permeable material having a tape-engaging face and sides extending downwardly therefrom, said tape-engaging face having at least two openings aligned with each other in the direction in which a tape is to be drawn over said face; erasing head means in said housing including a coil mounted about a core of magnetically permeable material, said core essentially being two sheets joined at a base and having two end pieces at the ends thereof, said base and top end pieces being offset from each other by an intermediate portion formed by two spaced sections of said pieces of material; said base being secured to one of said sides and said top end pieces extending through one of said openings with a gap between each end piece and said housing whereby said core forms a two path magnetic circuit with the housing being included in the circuit; recording head means in said housing including a coil and a magnetic circuit having core pieces protruding and exposed through the other of said openings in said tape-engaging face and forming a recording gap between the core pieces; and means for magnetically insulating said recording head means from said housing and erasing head means.

8. A combination head for tape recorders, comprising: a housing of magnetically permeable material having a tape-engaging face and sides extending downwardly therefrom, said tape-engaging face having at least two pairs of aligned openings aligned with each other in the direction in which a tape is to be drawn over said face; a pair of erasing head means in said housing forming a magnetic circuit with a portion of said housing; each of said erasing head means including a coil and core means protruding through one of said openings in said tape-engaging face forming an erasing gap means between said core means and said housing at said tape-engaging face; a pair of recording head means; each recording head means including core pieces and a coil arranged to provide a magnetic circuit with a gap at one end thereof, the core portions at said gap being adapted for tape-engagement; said pair of recording head means being encased in a magnetically insulated encasement forming a single dual recording head assembly with only the tape-engaging core portions exposed; said dual recording head assembly being mounted in said housing with the exposed tape-engaging core portions located in the other of said openings and flush with the tape-engaging face of said housing; and a two piece shield located on the sides of said assembly about said recording head coils and spaced a short distance from each other in the same direction as said recording head means are spaced.

References Cited by the Examiner

UNITED STATES PATENTS

| | | | |
|---|---|---|---|
| 2,736,776 | 2/1956 | Camras | 179—100.2 |
| 3,233,046 | 2/1966 | Moehring | 340—174.1 |

BERNARD KONICK, *Primary Examiner.*

A. I. NEUSTADT, *Assistant Examiner.*